A. J. HARDEN.
SYRUP SKIMMER.
APPLICATION FILED OCT. 22, 1910.
995,536.
Patented June 20, 1911.
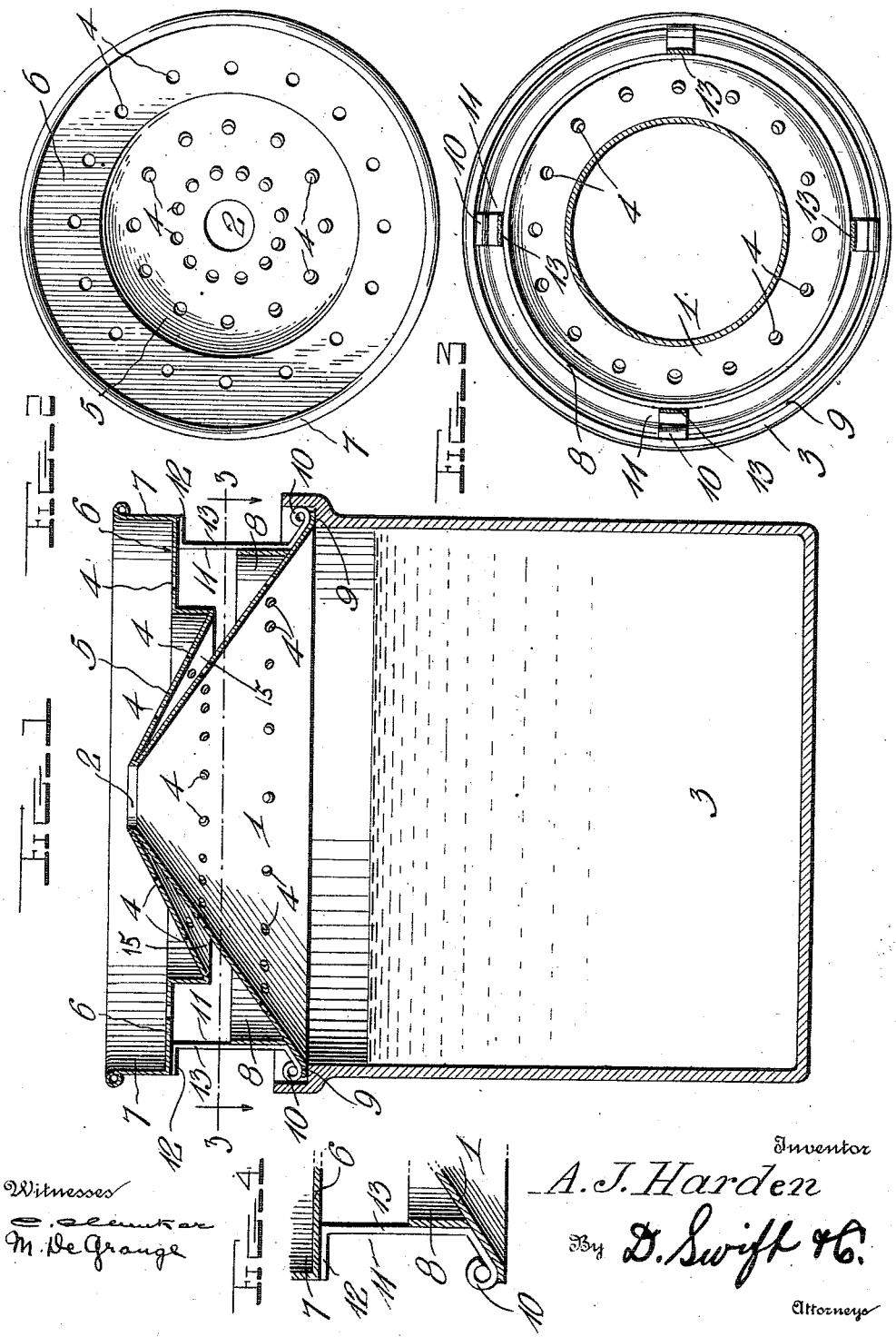

UNITED STATES PATENT OFFICE.

ANDREW J. HARDEN, OF GRETNA, FLORIDA.

SYRUP-SKIMMER.

995,536.

Specification of Letters Patent.   Patented June 20, 1911.

Application filed October 22, 1910.   Serial No. 588,481.

*To all whom it may concern:*

Be it known that I, ANDREW J. HARDEN, a citizen of the United States, residing at Gretna, in the county of Gadsden and State of Florida, have invented a new and useful Syrup-Skimmer; and I do hereby declare the following to be a full, clear, and exact description of the invention, such as will enable others skilled in the art to which it appertains to make and use the same.

The invention relates to a skimmer or strainer and has for its object to provide an improved device of this character designed to be used in the process of reducing cane juices to a syrup.

With these and other objects in view, as will hereinafter appear, the invention consists in the novel construction and arrangement of parts hereinafter described, shown and claimed.

In the drawings, Figure 1 is a vertical sectional view through the improved strainer. Fig. 2 is a plan view. Fig. 3 is a horizontal sectional view taken on the line 3—3 of Fig. 1. Fig. 4 is a detail fragmentary view of one of the supporting stays and adjacent parts.

Referring to the drawings, 1 designates a cone or frustum which is provided with a mouth or orifice 2.

In boiling juices of the character designed for use with this invention, the juice is poured into the boiler 3 and as it boils it rises and the impurities and foreign matter will pass up through the orifice and will return to the boiler through apertures 4 disposed in the cone 1 and the first strainer 5 and also in a horizontal portion 6 of the same. The upper section 5 is provided with an annular upwardly extending ring or member 7, which prevents an overflow of the juice as it boils through the orifice 2 and holds the same until it can return through the various apertures 4. The frustum 1 is also provided with an annular rim 8 similar to the one of the upper section. The purpose of this is to provide a reservoir for the collection of the juice as it descends through the upper section 1, which at times, may be faster than it can be admitted back into the boiler through the apertures of the cone or frustum 1. In combination with this strainer, the boiler 3 is used which is provided with a shoulder 9 which is engaged by the ends 10 of the stays 11 which support the outer portion of the strainer 5. The stays 11 have a horizontal portion 12 and a vertical portion 13 which firmly connect the upper section or strainer 5 with the frustum or cone 1. The ends 10 of the stays 11 frictionally engage the upper inner walls of the shoulder 9, so that the strainer is firmly held in engagement therewith forming a seal and any lateral displacement prevented.

By reference to Fig. 1 it will be seen that the space 15 between the cone 1 and the upper strainer is V-shaped, which effectively prevents the foreign matter from forming a clog or obstruction to the returning juice.

It will be seen that my improved strainer is simple, efficient and durable and that the same is especially adapted for separating foreign matter and skum from the juices when the same are being reduced to a syrup.

What I claim is:—

1. In combination with a boiler having its upper portion provided with an annular shoulder and a peripheral flange, a strainer comprising a frustum and a primary strainer merging upwardly toward one another at their central portions and fitting over one another at their upper portions and including a V-shaped space between them; the frustum having an annular rim 8, stays connecting between the primary strainer and the frustum and disposed on the exterior of the rim 8, and provided at their lower portions with angularly arranged extensions to engage the lower outer portion of the frustum said extensions terminating in coils adapted to engage the peripheral flange frictionally to hold the outer portion of the frustum close in contact with the shoulder thus forming a seal.

2. In combination with a boiler including a shoulder and a peripheral flange; a strainer comprising a frustum and a primary strainer including a V-shaped space between them, the frustum being inclined upwardly and toward the center of the strainer about its entirety and provided with annular rows of perforations and terminating at its upper central portion with a flange, the primary strainer comprising an outer annular horizontal portion including a vertical annular flange and provided with perforations, a central perforated portion inclining upwardly toward and adjacent the upper portion of the frustum and including an opening to fit over the flange of the top of the frustum, said annular horizontal portion and the central upwardly inclined portion of the primary strainer including an intermediate integral imperforated shouldered portion; said frustum adjacent its outer portion including a flange 8; and stays carried by the primary strainer engaging on the exterior of the flange 8 and terminating in projections to engage the flange of the boiler thus causing a seal between the frustum and the shoulder of the boiler, said stays constituting supports for the primary strainer.

In testimony whereof I have signed my name to this specification in the presence of two subscribing witnesses.

ANDREW J. HARDEN.

Witnesses:
 A. J. KEY,
 D. A. AVANT.

Copies of this patent may be obtained for five cents each, by addressing the "Commissioner of Patents, Washington, D. C."